United States Patent [19]

Tanaka et al.

[11] Patent Number: 5,075,156
[45] Date of Patent: Dec. 24, 1991

[54] MULTI-LAYERED CROSSLINKED ETHYLENIC RESIN FILM, A PROCESS FOR PRODUCTION THEREOF AND A METHOD OF APPLYING SAID FILM

[75] Inventors: Tohru Tanaka; Tatsuya Ohe, both of Suzuka, Japan

[73] Assignee: Asahi Kasei Kogyo Kabushiki Kaisha, Osaka, Japan

[21] Appl. No.: 322,851

[22] Filed: Mar. 14, 1989

[30] Foreign Application Priority Data

Mar. 15, 1988 [JP] Japan .................................. 63-59509

[51] Int. Cl.⁵ .............................................. B32B 7/00
[52] U.S. Cl. ..................................... 428/212; 428/415; 428/520
[58] Field of Search .................. 428/34.9, 520, 515, 428/212; 522/112; 156/275.5; 427/35, 36, 44; 426/127, 412, 415

[56] References Cited

U.S. PATENT DOCUMENTS 4,343,864 8/1982 Berejka ................................ 428/500

FOREIGN PATENT DOCUMENTS

| 0022184 | 1/1981 | European Pat. Off. . |
| 0288297 | 10/1988 | European Pat. Off. . |
| 50-12167 | 2/1975 | Japan . |
| 51-133368 | 11/1976 | Japan . |
| 54-78293 | 6/1979 | Japan . |
| 55-95568 | 7/1980 | Japan . |
| 58-18228 | 2/1983 | Japan . |
| 1033959 | 6/1966 | United Kingdom . |
| 1161259 | 8/1969 | United Kingdom . |
| 2040804A | 9/1980 | United Kingdom . |

Primary Examiner—Merrell C. Cashion, Jr.
Assistant Examiner—D. S. Nakarani
Attorney, Agent, or Firm—Armstrong, Nikaido, Marmelstein, Kubovcik & Murray

[57] ABSTRACT

Multi-layered crosslinked ethylenic resin films comprising a laminate of at least two ethylene resin layers crosslinked by irradiation with ionizing radiation are constructed in that an outer layer contains at least one specific crosslinking controlling agent such as hydrogenated terpene resin in a higher concentration than in an inner layer. The films are advantageously applicable to shrink packaging for foodstuffs.

4 Claims, 2 Drawing Sheets

MULTI-LAYERED CROSSLINKED ETHYLENIC RESIN FILM, A PROCESS FOR PRODUCTION THEREOF AND A METHOD OF APPLYING SAID FILM

BACKGROUND OF THE INVENTION

1. Field of the Invention

The present invention relates to a method for controlling a crosslinking degree of each layer in a laminate film and a multi-layered crosslinked ethylenic resin film obtained by such a method.

The film is advantageously applicable to shrink packaging.

2. Prior Art Statement

A conventional method for producing multi-layered crosslinked ethylenic resin films is known by, for example, U.S. Pat. No. 3,022,543. Electron beam-irradiated, crosslinked films obtained by this method are excellent in strength, transparency and heat shrinkable properties but involve drawbacks that due to an insoluble gel caused by the crosslinking, heat sealing characteristics are poor and packaging operation cannot be performed efficiently.

In order to improve the heat sealing characteristics, some methods for forming a film in multi-layers and controlling its crosslinking degree have been proposed. There are, for example, (1) a method in which an antioxidant such as di-t-butylcresol (BHT) or the like as a crosslinking-controlling agent is used in large quantities (more than 0.5 wt %) as shown in Japanese Patent Application KOKAI No. 50-12167, (2) a method in which a polyfunctional monomer such as diallyl maleate or the like is used as a crosslinking accelerator as shown in Japanese Patent Application KOKAI No. 55-95568, (3) a method in which a condensed polycyclic aromatic compound such as benzylnaphthalene or the like is used as a crosslinking-controlling agent as shown in Japanese Patent Application KOKAI No. 58-18228; and the like. In short, these methods are all intended to obtain an inner layer for enhancing stretching stability and imparting mechanical properties as a crosslinking film and a surface layer in a poorly crosslinked or non-crosslinked state under irradiation of electron beams in a dosage on the same level. According to the respective examples, it appears that the intended effect of controlling the crosslinking degree would apparently be exhibited.

On the other hand, Japanese Patent Application KOKAI No. 51-133368 discloses that polybutene, polyisobutylene, hydrogenated polybutene, rosins or polyterpenes are added as ordinary additives to a single layer electron beam-crosslinked film. However, this method lacks any technical idea of controlling the crosslinking degree using these additives.

However, the crosslinking-controlling agents used in (1) and (3) described above are low molecular weight substances so that these methods involve defects that (a) the substances evaporate off at a die outlet upon extrusion of a molten blend with resin at a high temperature to reduce its concentration and their crosslinking controlling effect cannot be sufficiently exhibited; (b) the evaporated additives adhere to a die outlet to deteriorate thickness deviation of the film; (c) when used in large quantities, extrusion stability is injured. The crosslinking accelerator in (2) described above has defects that the accelerator tends to be thermally crosslinked and bring about fish eye, during the course of blending with resin, melting the blend and extruding the molten blend at a high temperature.

Further films containing the crosslinking-controlling agents in (1), (2) and (3) encounter a problem that their application is limited, when the films are intended to use for food packaging. On the other hand, packaging films are used for various applications and often brought into contact with foods, once the films are released in the market. Therefore, naturally in the case for food packaging but also in general packaging films, close attention should be paid to hygienic safety of films.

In the light of the foregoing, there still remains the problems that any useful method for controlling a crosslinking degree, without reducing productivity, has not been developed under the actual situation and that food packaging films using such a method have not yet been commercially available. Furthermore in the field of shrink packaging using crosslinked films, additional problems encounter that packaging steps are complicated and troublesome, since films excellent in heat sealing characteristics are not present as described above.

SUMMARY OF THE INVENTION

In other words, an object of the present invention is to provide a method for controlling a crosslinking degree of each layer in a multi-layer film freely and easily, without reducing productivity.

Another object of the present invention is to provide a multi-layered crosslinked ethylenic resin film in which various properties such as heat sealing characteristics, tear strength, gloss, etc. are improved depending upon purposes of applying the film and which can be safely used for a variety of packagings including food packaging, for hygienic reasons.

A further object of the present invention is to provide a method for packaging in which steps in shrink packaging can be rationalized and stabilized by using the aforesaid film having excellent heat sealing characteristics.

As a result of various investigations to solve the problems described above, the present inventors have accomplished the present invention.

That is, the characteristic features of the present invention lie in the following 3 aspects:

i) A multi-layered crosslinked ethylenic resin film comprising a laminate of at least two ethylene resin layers which are crosslinked by irradiation with ionizing radiation, characterized in that at least one layer contains at least one crosslinking (gel fraction) controlling agent selected from Group (A) described below in an amount different from that in a layer adjacent to said layer.

ii) A process for producing a multi-layered crosslinked ethylenic resin film which comprises incorporating at least one substance selected from Group (A) described below into at least one layer of the laminate and irradiating the laminate with ionizing radiation, in such a state.

iii) A method of applying a shrinkable film to tight packaging which comprises performing preliminary packaging in a temporary fixing state of merely overlapping the ends of a film so as to cover the whole surface of a packaging good loosely with a multi-layered crosslinked ethylenic resin film containing at least one substance selected from Group (A) described below in a two-surface layer side in a higher concentration than in a core layer and having a cling strength of at least 0.6 kg/cm², then heating said preliminarily packaged good with hot air, hot water or steam to heat seal said temporarily fixed part of the film ends and at the same time, causing to shrink said film as a whole.

Group (A): hydrogenated petroleum hydrocarbon resin having a softening point of 70° to 140° C. and a specific gravity of 0.98 to 1.15 g/cm³ obtained by hydrogenating a cationic polymer of naphtha-cracked oil $C_9$ fraction or a thermal polymerization product of dicyclopentadiene; hydrogenated terpene resin having a softening point of 85° to 115° C. and a specific gravity of 0.99 to 1.01 g/cm³; terpene resin having a softening point of 30° to 120° C.; rosin having a softening point of 70° to 80° C. and a specific gravity of 1.05 to 1.10 g/cm³; a rosin derivative having a softening point of 70° to 115° C.; cumarone-indene resin having a softening point of 80° to 130° C.; an aliphatic petroleum hydrocarbon resin having a softening point of 65° to 115° C. and a specific gravity of 0.96 to 0.98 g/cm³ which is a cationic polymer of a naphtha-cracked oil $C_5$ fraction; and an aromatic petroleum hydrocarbon resin having a softening point of 80° to 150° C. and a specific gravity of 1.05 to 1.08 g/cm³ which is a cationic polymer of a naphtha-cracked oil $C_9$ fraction.

Phrased differently, the feature of the present invention resides in the technical idea of controlling a gradient arrangement of the crosslinking degrees (gel fractions) in the respective layers constituting the multi-layered film, using at least one substance selected from Group (A) described above.

DETAILED DESCRIPTION OF PREFERRED EMBODIMENTS

Hereafter the present invention is described by referring to drawings, tables and the like.

Figure 1:
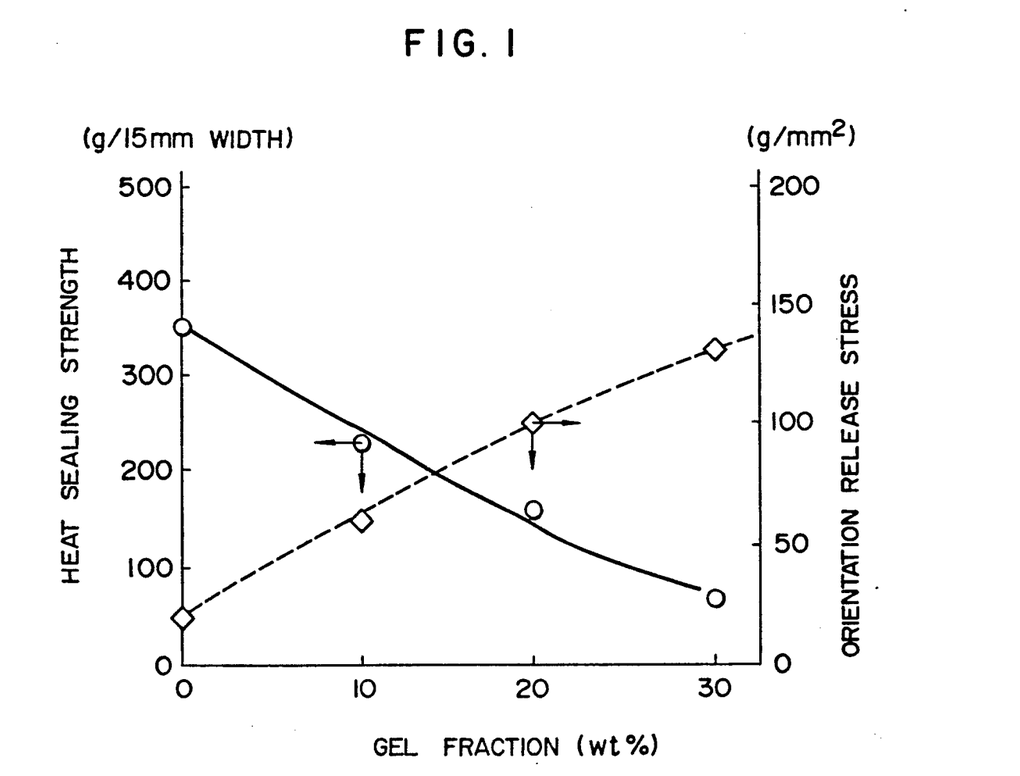
FIG. 1 is a graph showing the relationship between heat sealing strength or orientation release stress and gel fraction of a film.

First, the reasons why it is necessary to control the crosslinking are explained below. FIG. 1 (corresponding to Experiment 1) shows an influence of crosslinking on physical properties of a film, wherein a gel fraction of the film as a measure of its crosslinking degree is plotted on the abscissa and a heat seal strength and an orientation release stress which is a substitute property for packaging machinery characteristics of the crosslinked film are plotted on the ordinate. As is clear from FIG. 1, the lower the gel fraction, the more excellent the heat seal strength, whereas the higher the gel fraction, the more excellent the orientation release stress. It is thus impossible for a single layer film to satisfy both characteristics simultaneously. In order to improve heat sealing characteristics while maintaining mechanical properties inherently possessed by the crosslinked film, it is thus necessary to control crosslinking, for example, by constructing a film in multi-layers and restraining the gel fraction in the surface layer.

Figure 2:
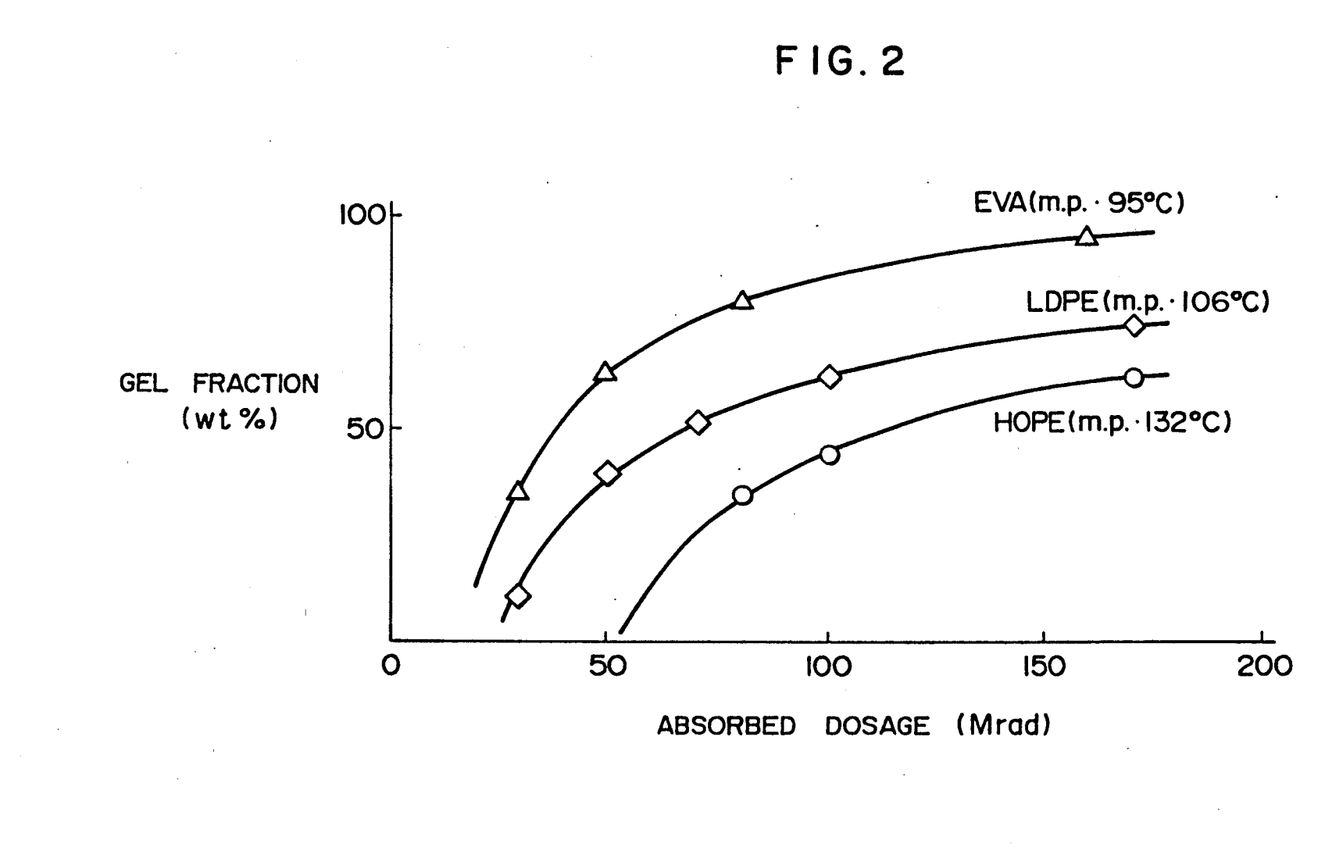
FIG. 2 is a graph showing a change in gel fraction on absorbed dosages of various resins.

FIG. 2 (corresponding to Experiment 2) shows crosslinking efficiencies of resins having different melting points, wherein an absorbed dosage of electron beams is plotted on the abscissa and a gel fraction is plotted on the ordinate. When ethylene resin is exposed to the same absorption dosage, there is a tendency that the lower the melting point (crystallinity) of the resin, the higher the crosslinking efficiency. On the other hand, in the case that the heat sealing characteristics of a film are intended to improve by constructing the film in multi-layers, it is general to use a heat sealing layer composed of resin having a low melting point and a heat resistant layer composed of resin having a high melting point. However, when the film is constructed in multi-layers using, for example, an ethylene-vinyl acetate copolymer in a heat sealing layer and high density polyethylene in a heat resistant layer followed by exposing the film to electron beams in a dosage of approximately 8 Mrad, the gel fraction in the heat sealing layer becomes markedly higher than the heat-resistant layer as is clearly noted from FIG. 2, which results in failure of good heat sealing. As such, the heat sealing characteristics cannot be improved in multi-layered crosslinked ethylenic resin films merely by laminating resins having different melting points in multi-layers so that it becomes necessary to control the crosslinking degree.

Next, in light of the necessity described above, the crosslinking controlling effect of the crosslinking-controlling agent in accordance with the present invention is described below. Table 1 shows gel fractions in single layer films added with some of the crosslinking-controlling agents of the present invention and in non-added films. Table 2 indicates gel fractions of a film in which an amount of the crosslinking-controlling agent added and an electron beam absorbed dosage are varied. Table 3 indicates a gel fraction in every layer of a multi-layer film, into an optional layer of which the crosslinking-controlling agent is incorporated. These tables reflect the results of Example 7. As is clear from Tables 1 and 2, the crosslinking-controlling agents of the present invention exhibit the sufficient crosslinking controlling effect, respectively; further by varying kind and addition amount of the controlling agent and absorbed dosage of electron beams, delicate control of the crosslinking degree can be made. Furthermore as shown in Table 3, when the crosslinking-controlling agent of the present invention is used in the multi-layered film, it is not only possible to control the crosslinking degree in the surface layer and the inner layer of the multi-layered film, but also possible to incorporate the controlling agent into the surface layer of a film in which the surface layer is crosslinked in a higher degree than in the inner layer when no crosslinking-controlling agent is added, thereby to crosslink the inner layer conversely in a higher degree than in the surface layer.

TABLE 1

| Substance | Sample | Property | Gel Fraction (%) (added in 2%) |
|---|---|---|---|
| Hydrogenated petroleum hydrocarbon resin | ARKON (Arakawa Chemical Co., Ltd.) | M.W. = 630 | 16 |
| Hydrogenated petroleum hydrocarbon | ESCOREZ (Exon Chemical | M.W. = 290 | 11 |

TABLE 1-continued

| Substance | Sample | Property | Gel Fraction (%) (added in 2%) |
|---|---|---|---|
| resin | Inc.) | | |
| Hydrogenated terpene resin | CLEARON P-125 (Yasuhara Yushi Co., Ltd.) | M.W. = 700 | 0 |
| Terpene resin | YS RESIN Px-700 (Yasuhara Yushi Co., Ltd.) | | 0 |
| Rosin ester | SUPER ESTER A-125 (Arakawa Chemical Co., Ltd.) | | 0 |
| Coumarone indene resin | COUMARON RESIN RG 1/2 (Nippon Steel Inc.) | | 0 |
| Aliphatic petroleum hydrocarbon resin | ESCOREZ 1304 (Exon Chemical Inc.) | M.W. = 850 | 0 |
| Aromatic petroleum hydrocarbon resin | PETCOL LX-T (Toyo Soda Mfg. Co., Ltd.) | M.W. = 900 | 0 |
| None | | | 40 |

M.W.: molecular weight

TABLE 2

| Absorbed Dosage (Mrad) | Addition Amount (%) | Gel Fraction (%) | | | |
|---|---|---|---|---|---|
| | | None | 1.0 | 2.0 | 5.0 |
| 4.0 | | 28 | 14 | 3 | 0 |
| 5.0 | | 40 | 24 | 16 | 0 |
| 5.6 | | 47 | 40 | 29 | 0 |

TABLE 3

| Polymer of Each Layer (1st/2nd/3rd layer) | Crosslinking Controller (Layer added) | Crosslinking Controller (Amount added) | Absorbed Dosage (Mrad) | Gel Fraction (%) First Layer | Gel Fraction (%) Second Layer | Gel Fraction (%) Third Layer |
|---|---|---|---|---|---|---|
| LDPE-a/LDPE-a/LDPE-a | none | | 5.0 | 40 | 40 | 40 |
| | ARKON P-90 (1st/3rd) | (3 pbw) | 5.0 | 0 | 40 | 0 |
| | ARKON P-90 (2nd) | (2 pbw) | 5.0 | 40 | 16 | 40 |
| EVA-a/HDPE-a/EVA-a | none | | 6.5 | 75 | 20 | 75 |
| | Hydrogenated terpene resin (1st/3rd) | (4.5 pbw) | 6.5 | 2 | 20 | 2 |
| HDPE-a/LDPE-a/HDPE-a | none | | 7.5 | 30 | 55 | 30 |
| | ESCOREZ 5300 (2nd) | (3 pbw) | 7.5 | 30 | 3 | 30 |

NOTES:
pbw: Parts by weight
LDPE-a: Low density polyethylene, density = 0.92 g/cm$^3$, MI = 0.4, melting point = 106° C.
EVA-a: Ethylene-vinyl acetate copolymer, vinyl acetate = 10 wt %, MI = 1.0
HDPE-a: High density polyethylene, density = 0.95 g/cm$^3$, MI = 1.0, melting point = 132° C.

Next, it is described below that the process of the present invention using the crosslinking-controlling agent of the present invention provides excellent productivity.

Table 4 (corresponding to Example 8) indicates the results of extrusion tests on the crosslinking-controlling agent of the present invention and crosslinking-controlling agents (1), (2) and (3) of the prior art. The polyfunctional monomer used in the prior art (2) has a poor productivity because fish eye which is believed to occur due to thermal crosslinking in an extruder is formed in large quantities and a large number of punctures assumed to be attributable to the fish eye generate in the subsequent stretching step. In addition, the resulting film is inferior in its appearance and has a poor mechanical strength. The antioxidant and condensed polycyclic aromatic compound in the prior art (1) and (3) have wide fluctuations in load when extruded and are inferior in extrusion stability. Furthermore, evaporation of these additives from a die outlet is also remarkable and the evaporated additives tend to be adhered to the die outlet as a stain and thickness deviation of a film tends to occur. Thus, the methods (1) and (2) have a poor productivity as well. Moreover, the film obtained using such an antioxidant is colored yellow and of low commercial value. On the other hand, in the film obtained using hydrogenated petroleum hydrocarbon resin, which is one of the crosslinking-controlling agent of the present invention, its heat stability is good and there is no formation of fish eye, etc. The crosslinking-controlling agent is devoid of the problems of evaporation and the like because of its high molecular weight and can facilitate stable extrusion. Furthermore, the controlling agent has an effect of improving fluidity of resin, can reduce load in extrusion and can enhance productivity. The resulting film is also free from the problems of coloration, unpleasant odor, etc. and good.

TABLE 4

| Kind of Crosslinking Controller | Amount Added (%) | Fish Eye (/m²) | Remain (%) | Extrusion Load (A) | Fluctuation in Load (%) | Total Evaluation |
|---|---|---|---|---|---|---|
| Example: | | | | | | |
| Hydrogenated petroleum hydrocarbon resin | 5.0 | 2 ○ | 95 ○ | 180 ○ | 3.0 ○ | 8 ○ |
| Comparative Example: | | | | | | |
| Antioxidant* (4-methyl-2,6-di-t-butylphenol) | 4.0 | 3 ○ | 45 x | 208 | 9.6 x | 3 x |
| Polyfunctional monomer** (diallyl maleate) | 0.5 | 34 x | 70 | 215 x | 5.3 | 2 x |
| Condensed polycyclic aromatic compound*** (benzylmethylnaphthalene) | 3.0 | 17 | 50 x | 209 | 7.7 x | 2 x |
| None | 0 | 5 | — | 210 | 4.0 | — |

*Prior Art (1): duplication of Japanese Patent Application KOKAI No. 50-12167
**Prior Art (2): duplication of Japanese Patent Application KOKAI No. 55-95568
***Prior Art (3): duplication of Japanese Patent Application KOKAI No. 58-18228

As the substance having the crosslinking controlling effect in the present invention, there are hydrogenated petroleum hydrocarbon resin, hydrogenated terpene resin, terpene resin, rosin, rosin derivatives, cumarone-indene resin, aliphatic petroleum hydrocarbon resin and aromatic petroleum hydrocarbon resin.

The hydrogenated petroleum hydrocarbon resin is one obtained by hydrogenating a cationic polymer of naphtha-cracked oil C₉ fraction (vinyltoluene, methylstyrene, indene, etc.) or a thermal polymerization product of dicyclopentadiene. The resin is exemplified by a structural formula:

or and has characteristic values of a softening point of 70° to 140° C. and a specific gravity of 0.98 to 1.15 g/cm³. The hydrogenated petroleum hydrocarbon resin is commercially available under the trademarks of ARKON (manufactured by Araka Chemical Co., Ltd.), ESCOREZ (manufactured by Exon Chemical Inc.), etc.

The hydrogenated terpene resin is represented by a structural formula:

and has characteristic values of a softening point of 85° to 115° C. and a specific gravity of 0.99 to 1.01 g/cm³. The hydrogenated terpene is commercially available under the trademark of CLEARON (manufactured by Yasuhara Yushi K.K.).

The terpene resin is a cationic polymer of α-pinene or β-pinene and exemplified by the following structural formula:

which has a softening point of 30° to 120° C. The terpene resin is commercially available, for example, under the trademark of YS Resin (manufactured by Yasuhara Yushi K. K.).

The rosin is a naturally ocurring substance purified from pine resin, etc. and has a characteristic value of its softening point of 70° to 80° C.

The rosin derivative includes disproportionation rosin glycerine esters, hydrogenated rosin glycerine esters, etc. and has the characteristic value of a softening point of 70° to 115° C. The rosin derivative is commercially available under the trademarks of SUPER ESTER, ESTER GUM (manufactured by Arakawa Chemical Co., Ltd.).

The cumarone-indene resin is a polymer of indene-coumarone contained in tar naphtha and exemplified by the following structural formula:

which has the characteristic value of a softening point of 80° to 130° C. This resin is commercially available, for example, under the trademark of COUMARON RESIN (manufactured by Nippon Steel Corporation).

The aliphatic petroleum hydrocarbon resin is a cationic polymer of a naphtha-cracked oil $C_5$ fraction (isoprene, 1,3-pentadiene, pentene) and exemplified by the following structural formula:

which has the characteristic values of a softening point of 65° to 115° C. and a specific gravity of 0.96 to 0.98 g/cm$^3$, which is commercially available, for example, under the trademark of Hirez (manufactured by Mitsui Petrochemical Co., Ltd.).

The aromatic petroleum hydrocarbon resin is a cationic polymer of a naphtha-cracked oil $C_9$ fraction and exemplified by the following structural formula:

which has the characteristic values of a softening point of 80° to 150° C. and a specific gravity of 1.05 to 1.08 g/cm$^3$. The resin is commercially available, for example, under the trademark of Pectcol (manufactured by TOSO Co. Ltd.).

Of these crosslinking-controlling agents, the hydrogenated petroleum hydrocarbon resin, hydrogenated terpene resin and terpene resin are preferably used in view of their heat resistance, odor, etc.

The amount of the crosslinking-controlling agent to be added may be varied depending upon polymer, construction of multi-layer and exposed dosage but is generally in the range of 0.5 to 10 wt % in a layer wished to lower the crosslinking degree. With less than 0.5 wt %, the crosslinking controlling effect is insufficient. When the amount exceeds 10 wt %, transparency is injured due to bleeding of the controlling agent onto the surface and at the same time, film forming property is reduced. If circumstances require, it is also possible to incorporate the crosslinking-controlling agent into other layers in a range of 0 to 5 wt %; in this case, it is preferred that the amount be set to ½ or less than that in the layer wished to lower the crosslinking degree.

The ethylenic resin which can effectively utilize the control of the crosslinking and give excellent properties refers to polyethylene, namely, high density polyethylene, low density polyethylene, linear low density polyethylene and very low density polyethylene, and ethylene-vinyl acetate copolymer. One of or a blend of at least two of these ethylene resins are effective.

A method for forming the film in multi-layers is not particularly limited but conventional known techniques may be applicable. There are, for example, a co-extrusion method, a laminate method, a coating method, etc., with the co-extrusion method being preferred. The construction of the layer for controlling the crosslinking and the layer for maintaining the crosslinking degree may be of at least two layers. When it is wished to obtain good heat sealing characteristics in all packaging modes, however, it is preferred that the film be constructed with at least 3 layers. For example, in the case of a 3 layer film, a layer thickness ratio in the respective layers is such that the surface layer/core layer/surface layer is 1/1/1 to 1/20/1.

Taking packaging applications into account, a wall thickness suitable for the film of the present invention is generally 6 to 80 μm, preferably, 8 to 60 μm.

The crosslinking method according to the present invention is carried out by irradiation of ionizing radiation. That is, α-rays, β-rays, γ-rays, neutron rays, accelerated electron beams, etc. may be used in an absorbed dosage of 1 to 20 Mrad so as to concert with kind of polymer, film thickness and layer construction.

It is preferred that the crosslinking degree of the film be 5 to 50% in terms of the gel fraction as the whole film. In this case, it is more preferred that the gel fraction be 0 to 40% in the crosslinking controlling layer and 20 to 60% in other crosslinking layer.

It is not necessarily required in the present invention to stretch and orient the film crosslinked through irradiation. However, when it is intended to obtain the film having heat shrinkability, the film may be oriented in a conventional fashion. In this case, the film may be stretched monoaxially or biaxially by 2 to 10 times per one axis, at a stretching temperature of, e.g., a melting point or higher, depending upon heat shrinkability required.

Other additives conventionally used for plastic processing, i.e., an anti-fogging agent, a heat stabilizer, an anti-blocking agent, a slip agent, etc. may be used in such a range that does not interfere the effect of the crosslinking-controlling agent, for example, not greater than 5 wt %, in the production of the crosslinked film of the present invention.

As has been made clear through the principle and description of the process according to the present invention, it will be readily understood that the crosslinked multi-layer film having a controlled crosslinking degree in each layer can be easily produced according to the process of the present invention. The film of the present invention and the process for production thereof will be later described in detail in the examples hereinafter. Next, the method for using the film of the present invention is described below.

For conventional mode of shrink packaging, it is generally adopted a method which comprises overlapping both ends of a flat film with each other, heat sealing the overlapped portion to form a tubing film, inserting a packaging good into the tubing film, folding the ends of the tubing film down toward the packaging good and then heat sealing the film; alternatively subjecting the overlapped ends of the tubing film to melt cut sealing to obtain a preliminary package and, heating the preliminary package in a hot air oven to cause shrinkage and complete the packaging.

Turning now to the method for applying the film of the present invention, the crosslinked multi-layer film of the present invention containing the crosslinking-controlling agent in its surface layer in a high concentration has excellent heat sealing characteristics and cling strength. Utilizing these properties, the heat sealing to be made for the preliminary packaging in the aforesaid packaging mode is omitted but the preliminary packaging is conducted merely by the temporary fixing through the cling strength of the film and, heat sealing and shrinkage are simultaneously carried out by heating. When a conventional crosslinked single layer film is packaged by the method of the present invention, the temporarily fixed part is peeled off during running due to its insufficient cling strength. Even if the preliminary packaging were performed satisfactorily, the temporarily fixed part is peeled off due to orientation release stress during heat shrinkage because the heat sealing characteristics are poor. Thus, the packaging cannot be made satisfactorily. That is, the heat sealing in the course of preliminary packaging is essentially required under the actual situation. The very necessity of heat sealing makes current packaging steps complicated and reduces efficiency, details of which will be later described in the examples hereinafter.

Hereafter, measurement methods and the like used in the present invention are summarized below.

(1) Gel fraction

A sample is extracted with boiling p-xylene. A rate of insoluble matters is expressed by the following equation. The gel fraction is used as a measure of crosslinking degree.

$$\text{gel fraction} = \frac{\text{weight of sample after extraction}}{\text{weight of sample before extraction}} \times 100\ (\%)$$

(2) Heat sealing strength

The heat sealing strength is a numerical value of a peeling strength of a test pieace measured with a tensile tester. The test piece is obtained by sealing with a centinel heat sealer under the conditions of 130° C. and 0.5 sec and by cutting into a width of 15 mm.

(3) Orientation release stress

The orientation release stress was measured similarly according to the ASTM-D-2838 method.

(4) Absorbed dosage

The dosage is expressed by a unit of rad. 1 rad indicates that energy of 100 erg is absorbed per 1 g of a substance.

(5) Haze

The haze was measured according to the ASTM-D-1003 method.

(6) Tearing impact strength

This strength was measured similarly in accordance with the JIS-P-8116 method.

(7) Free shrink

The free shrink was measured by the ASTM-D-2732 method.

(8) Bottom sealing temperature range

A tray (10 cm×20 cm) made of commercially available polypropylene is wrapped with a film to make a 4-layer portion and 2-layer portion of the film at the bottom of the tray. The tray was pressed under a force of 2 g/cm$^2$ for 2 seconds to heat seal the film. The bottom sealing temperature range is defined to be a range of from the temperature at which no peeling occurs, by gently stretching the film edges, to the temperature at which the film shrinks to peel the seal off or tear the film.

(9) Gloss

The gloss was measured by the ASTM-D-2457-70 method.

(10) Cling strength

The surfaces of two sample films each lined with an adhesive tape having a width of 10 cm were pressed under a finger pressure at an area of 3 cm$^2$. A shearing force for peeling the adhered surfaces off was measured by pulling the films with a tensile tester. The cling strength is expressed by a value converted per 1 cm$^2$ of the area.

(11) Melt cut sealing temperature

A bar having a cross section of 0.5 R for melt cut sealing was mounted to a heat sealer and 2 films were sealed and cut simultaneously under the condition of 0.5 second. In this case, the lower limit temperature capable of performing the melt cut sealing was defined to be a temperature for simultaneous sealing and cuttign.

Hereafter the films of the present invention and the method for using the same are described in detail, by referring to the examples.

Resins used in the experiments and the examples are listed below.

EVA-a: Ethylene-vinyl acetate copolymer, vinyl acetate=10 wt %, MI=1.0
EVA-b: Ethylene-vinyl acetate copolymer, vinyl acetate=15 wt %, MI=1.0
LDPE-a: Low density polyethylene, density=0.92 g/cm$^3$, MI=0.4, melting point=106° C.
LDPE-b: Low density polyethylene, density=0.919 g/cm$^3$, MI=2.0, melting point=105° C.

HDPE-a: High density polyethylene, density=0.95 g/cm$^3$, MI=1.0, melting point=132° C.

LLDPE-a: Linear low density polyethylene, comonomer: 4-methylpentene-1, density=0.93 g/cm$^3$, MI=2.1, melting point=122° C.

LLDPE-b: Linear low density polyethylene, comonomer: octene-1, density=0.93 g/cm$^3$, MI=2.0, melting point=121° C.

VLDPE-a: Very low density polyethylene, comonomer: 4-methylpentene-1, density=0.910 g/cm$^3$, MI=2.0

EXAMPLE 1

This example shows that the film of the present invention having a controlled crosslinking degree at the surface layer has excellent heat sealing characteristics and tearing impact strength.

EVA-b, 95 wt %, and 5.0 wt % of hydrogenated petroleum hydrocarbon resin (manufactured by Arakawa Chemical Co., Ltd., trademark: ARKON P-90) were kneaded with a kneader at 160° C. for 10 minutes. The resulting blend was extruded as the surface layer and LLDPE-a was extruded as the core layer, into a tube having a thickness of 400 μm, through a two-coat-3-layer circular die using 2 extruders. In this case, 0.3 wt % of glycerine monooleate per each layer was charged in each extruder as an anti-fogging agent and kneaded together. A layer thickness ratio of the surface layer/core layer/surface layer was 1/8/1. This tubing film was folded into a flat shape and exposed to 7.5 Mrad of electron beams under the conditions of 500 KV and 21 mA using an electron beam generator (manufactured by Nisshin High Voltage Co., Ltd.) to cause crosslinking. The gel fraction was 24% as a whole. The tube was heated to 150° C. of the film temperature and subjected to inflation by 6.5 times to the machine direction and by 6 times to the transverse direction. The crosslinked film having a thickness of 10 μm was thus obtained and made Sample No. 1.

As Sample No. 2, a single layer film was obtained by using LLDPE-a as a raw material, adding 0.3 wt % of glycerine monooleate thereto, kneading them and performing extrusion, irradiation and stretching under the same conditions as in Sample No. 1. The gel fraction was 30%.

Various physical properties of offthe films as Sample No. 1 and Sample No. 2 are shown in Table 5. The gel fraction of Sample No. 1 in each layer was calculated as 0% in the surface layer, because the gel fraction of the sample was 30% when the surface layer had been removed from the sample.

TABLE 5

| | Sample No. | |
|---|---|---|
| | Example No. 1 | Comparative Example No. 2 |
| Gel fraction (%) | | |
| Surface layer | 0 | 30 |
| Core layer | 30 | |
| Maximum free shrinkage factor (MD + TD)/2 (%) | 80 | 80 |
| Maximum orientation release stress (MD + TD)/2 (g/mm$^2$) | 140 | 150 |
| Bottom seal range (°C.) | 60 (120–170) | 20 (140–150) |
| Tearing impact strength (g) | 6.0 | 3.0 |
| Haze (%) | 1.2 | 1.8 |

TABLE 5-continued

| | Sample No. | |
|---|---|---|
| | Example No. 1 | Comparative Example No. 2 |
| Cling strength (kg/cm$^2$) | 0.9 | 0.4 |

MD: machine direction
TD: transverse direction

EXAMPLE 2

This example shows that the film of the present invention obtained in Example 1 can be extremely advantageously used for overwrap shrink packaging and the film can achieve the rationallization and promotion of efficiency because of its excellent heat sealing charac-. teristics.

First, packaging steps are described with reference to elements marked denoted by symbols, taking an overwrap shrink packaging machinery (manufactured by Ibaragi Seiki K.K.: SP-300) as an example. The packaging proceeds in the order of (a) supply of a packaging good, (b) feeding and tubing of a film, (c) cutting and folding of the film, (d) heat sealing of the bottom with a hot plate and (e) shrinkage through a hot air tunnel. During these steps, heat sealing is carried out at the part (center sealing part) for molding the film into a tubing form in step (b) and at the bottom sealing part in step (d). The film heating is performed at 3 portions in steps (b), (d) and (e) described above. These packaging steps are complicated and consume much electric power.

Packaging test was performed using the packaging machinery (SP-300) described above. Sample Nos. 1 and 2 of Example 1 were used as films and as packaging goods, 3 packaging goods, i.e., contents weighing 100 g and 300 g, each encased in a tray and a good having such a structure as a concaved bottom tray so as to not apply a sufficient pressure to the sealing surface, were used. Center sealing and bottom sealing were carried out under the 2 conditions of heating at 140° C. and with a heater turned off.

The results of the packaging test are shown in Table 6. The results were evaluated with the bottom heat sealing in terms of the following measures.

⊚: The bottom surface was completely sealed.
o: The bottom surface was partly sealed.
α: The seal was easily peeled off.
x: The bottom surface was not sealed at all.

TABLE 6

| Temperature of Heat Sealer | Sample No. | Content | | Concaved Bottom |
|---|---|---|---|---|
| | | 100 g | 300 g | |
| 140 | No. 1 | ⊚ | ⊚ | ⊚ |
| | No. 2 | Δ | o | X |
| 20 (no heating) | No. 1 | ⊚ | ⊚ | ⊚ |
| | No. 2 | X | X | X |

Turning first to the condition using the heater, Sample No. 2 has a narrow sealing temperature range so that the sealing was not good with the lightweighted packaging good under this temperature condition. In order to apply this film to packaging, it is necessary to adjust the temperature of the heat sealer every time when the weight of a packaging good changes and its efficiency is poor. With the concaved bottom tray, no bottom sealing was attained. On the other hand, the film of the present invention (Sample No. 1) could achieve good heat sealing both for the packaging goods having different weights and for the concaved bottom tray, under the definite temperature condition.

On the other hand, in the case where no heater was used, when Sample No. 2 was used to package the light-weighted good and the concaved bottom tray, the center sealing part was peeled off during running and the intended packaging failed. Further in the case of the heavy content, the film of Sample No. 2 was not heat sealed in the hot air tunnel but peeled off or curled and the resulting package was of no commercial value. To the contrary, as shown in Table 5, Sample No. 1 was excellent in cling strength so that no peeling-off of the film occurred during running and heat sealing was completely effected in the hot air tunnel and at the same time, shrinkage was good and the resulting package had an extremely excellent appearance. Furthermore, an electric power consumed could be saved by 25% because no heater was used for the heat sealing. Example 3

Films were prepared in a manner similar to Example 1 except that resins for the surface layer and the inner layer, kind and addition amount of the crosslinking-controlling agent, a thickness ration of layers, absorbed dosage of electron beams and, temperature and magnification of stretching were varied as shown in Table 7. The gel fraction of the films was within the range of 20 to 40% in average of the whole layers. The sealing strength of the resulting films is also shown in Table 7.

Sample Nos. 3 through 5 were obtained by laminating different kinds of polymers. Sample Nos. 6 and 7 were obtained by laminating the same kind of polymers. In both cases, the crosslinking degree at the surface layer is controlled to realize a good heat sealing strength. On the other hand, Sample Nos. 8 and 9 are identical with Sample Nos. 3 and 6, resdpectively, except that no crosslinking-controlling agent was added thereto. Sample Nos. 8 and 9 had poor heat sealing strength. In addition, haze of Sample No. 8 was 1.5 whereas Sample No. 3 showed haze of 1.2; Sample No. 9 showed haze of 1.8 whereas Sample No. 6 showed haze of 1.5. Based on these results, transparency was improved in Sample Nos. 3 and 6. While the reason is unclear, it is assumed that the effect would be attributable to the crosslinking-controlling agent of the present invention incorporated into Sample Nos. 3 and 6.

TABLE 7

| | Sample No. | | | | | | |
|---|---|---|---|---|---|---|---|
| | Example | | | | Comparative Example | | |
| | 3 | 4 | 5 | 6 | 7 | 8 | 9 |
| Surface layer: | | | | | | | |
| Resin (blend ratio) | EVA-b | EVA-a | LDPE-b | EVA-a | LLDPE-a /LDPE-a (75/25) | EVA-b | EVA-a |
| Crosslinking controlling agent (addition amount) | Hydrogenated petroleum (6.0%) | Terpene resin (4.0%) | Aliphatic petroleum resin (2.0%) | Hydrogenated terpene (2.0%) | Rosin (1.0%) | — | — |
| Inner layer: | | | | | | | |
| Resin (blend ratio | LLDPE-a /LDPE-a (90/10) | HDPE-a /LDPE-a (70/30) | LLDPE-b | EVA-a | LLDPE-a /LDPE-a (75/25) | LLDPE-a /LDPE-a (90/10) | EVA-a |
| Layer thickness ratio (surface/ core/ surface) | 1.5/7 /1.5 | 2/6/2 | 1/8/1 | 1/8/1 | 2/6/2 | 1.5/7 /1.5 | 1/8/1 |
| Absorbed dosage (Mrad) | 7.0 | 8.0 | 7.5 | 3.0 | 7.0 | 7.0 | 3.0 |
| Stretching conditions: | | | | | | | |
| Stretching temperature (°C.) | 150 | 160 | 150 | 130 | 150 | 150 | 130 |
| Stretching magnification (MD × TD) | 6.5 × 6 | 6.5 × 6 | 7 × 5.5 | 6 × 5 | 6.5 × 6 | 6.5 × 6 | 6 × 5 |
| Heat sealing strength (g/15 mm width) | 300 | 350 | 180 | 350 | 150 | 30 | 70 |

EXAMPLE 4

This example shows that the films of the present invention in which the crosslinking degree is controlled in the core layer have excellent surface properties and can be advantageously used for pillow shrink packaging.

Films were prepared in a manner similar to Example 3 under the conditions shown in Table 8. The gel fraction in each layer was determined by calculating the gel fraction in the surface layer, based on the gel fractions measured with the whole layers and the gel fraction measured with each sample from which the surface layer had been removed. Physical properties of the films are also shown in Table 8.

In Sample Nos. 10 and 13, the same stretching was performed using the same polymer. Sample No. 10 in which the gel fraction of the surface layer was relatively increased by lowering the crosslinking degree of the core layer showed more excellent gloss and tear impact strength than in Sample No. 13. Sample No. 10 had excellent resistance to chemical because of the high gel fraction in the surface layer.

Sample Nos. 11 and 12 could be advantageously used for pillow shrink packaging. The pillow shrink packaging is a packaging mode characterized in that the heat sealing part in the overwrap shrink packaging explained in Example 2 is subjected to melt cut sealing. The melt cut sealing are of type that sealing is carried out with heating and at the same time, the film is fused and cut. A conventional crosslinked single layer film involves a defect that the melt cut sealing property is poor due to non-fusible gel fraction so that a temperature for the melt cut sealing must be very high. To the contrary, in Sample Nos. 11 and 12 of the present invention, the gel fraction in the core layer predominating the major part of the film was controlled to be extremely low so that the melt cut sealing became possible. On the other hand, the non-crosslinked shrinkage film was sealed at a low temperature for the melt cut sealing but involved a defect that a bar used for the melt cut sealing tended to adhere to the film, resulting in inferior transparency and poorer shrinkage properties of the film to and than those of the crosslinked film. The films (Sample Nos. 11 and 12) of the present invention were crosslinked only at the surface layer to a suitable degree, showed excellent transparency and had a high shrink.

this film in the respective layers were 30% in the outer layer and 0% in the inner layer.

The film of Sample No. 14, which was flattened by cutting the tube open, was folded such that the LLDPE-b layer was located inside. The folded film was sealed at both edges with a heat sealer and then cut to form a bag. The heat sealing characteristics were good and operability for forming the bag was also good. After a packaging good was inserted into the bag, vacuum packaging was carried out by sucking the air out of the bag and sealing the opening. The bag was free from any inconvenience due to pinholes, etc. at the sealed portion and had the outer layer with highly crosslinking degree and hence, showed excellent gloss.

EXAMPLE 6

EVA-b, 97 wt %, and 3.0 wt % of hydrogenated terpene resin were kneaded with a kneader to use as a

TABLE 8

| | Sample No. | | | |
|---|---|---|---|---|
| | Example | | | Comparative Example |
| | No. 10 | No. 11 | No. 12 | No. 13 |
| Surface layer Polymer | LDPE-a | LLDPE-a /EVA-a = 70/30 | HDPE-a /EVA-a = 80/20 | LDPE-a |
| Core layer Polymer | LDPE-a | LLDPE-a | LLDPE-b | LDPE-a |
| Crosslinking controller (amount) | Hydrogenated terpene resin (4.0%) | Hydrogenated petroleum hydrocarbon resin (2.0%) | Terpene resin (1.5%) | — |
| Layer thickness ratio (surface layer/core layer/ surface layer) | 1/2/1 | 1/4/1 | 1.5/7/1.5 | 1/2/1 |
| Absorbed dosage (Mrad) | 9.0 | 6.5 | 6.5 | 4.3 |
| Stretching condition: | | | | |
| Stretching temperature (°C.) | 140 | 145 | 140 | 140 |
| Stretching magnification (MD × TD) | 6.5 × 6 | 6.5 × 6 | 6.5 × 6 | 6.5 × 6 |
| Gel fraction (%) | | | | |
| Surface layer | 60 | 40 | 30 | 30 |
| Core layer | 0 | 0 | 5 | 30 |
| Gloss (%) | 145 | 135 | 140 | 130 |
| Maximum free shrink (MD + TD)/2 (%) | 80 | 80 | 80 | 80 |
| Tear impact strength (MD + TD)/2 (g/mm$^2$) | 5.0 | 6.5 | 6.0 | 2.0 |
| Temperature for melt cut sealing (°C.) | 160 | 145 | 140 | 170 |

EXAMPLE 5

LLDPE-b, 93 wt %, and 7.0 wt % of terpene resin were kneaded with a kneader to use as the inner layer. A 3:1 blend of LLDPE-b and EVA-b was used as the outer layer. The resulting blends were co-extruded into a tube having a thickness of 600 μm, through a two-coat-2-layer circular multi-layer die using 2 extruders. A layer thickness ratio of the inner layer to the outer layer was ½. This tube was folded into a flat shape and exposed to 7.5 Mrad of electron beams using an electron beam generator (manufactured by Nisshin High Voltage Co., Ltd.). The tube was then heated to 145° C. and subjected to inflation by 4 times to the machine direction and by 3.8 times to the transverse direction to give a film having a thickness of 40 μm. The gel fractions of surface layer. A 3:1 blend of LLDPE-a and LDPE-a was used as an intermediate layer. LLDPE-a, 95 wt %, and 5.0 wt % of hydrogenated petroleum hydrocarbon resin (manufactured by Exon Chemical Inc., trademark, ESCOREZ 5300) were kneaded with a kneader to use as a core layer. The resulting blends were co-extruded into a tube having a layer construction of surface layer-/intermediate layer/core layer/intermediate layer/surface layer and a total thickness of 400 μm, through a three-coat-5-layer circular die using 3 extruders. In this case, 0.3 wt % of glycerine monooleate per each layer was charged in each extruder as an anti-fogging agent and kneaded together. A layer thickness ratio of the surface layer/intermediate layer/core layer/intermediate layer/surface layer was 1/3/2/3/1. This tubing film was folded into a flat shape and exposed to 7.0 Mrad of electron beams using an electron beam generator (manufactured by Nisshin High Voltage Co., Ltd.). The tube was then heated to 135° C. and subjected to inflation by 6.5 times to the machine direction and by 6 times to the transverse direction to give a film having a thickness of 10 μm. This film was made Sample No. 15. The gel fractions of this film in the respective layers were assumed to be 0% in the surface play, 30% in the intermediate layer and 0% in the core layer.

Sample No. 15 is a film suitable for the overwrap packaging as in the films of the present invention obtained in Examples 1 through 3. The film is not only excellent in heat sealing characteristics, transparency and cling strength but also provides strong strength in packaging goods having protrusions.

EXAMPLE 7

This example shows that the crosslinking-controlling agent of the present invention has a high crosslinking controlling effect and by using the crosslinking-controlling agent, the crosslinking degree in each layer of the multi-layered film can be freely varied.

After 100 parts by weight of LDPE-a and 2.0 parts by weight of various additives shown in Table 1 were kneaded with a kneader at 180° C. for 10 minutes, the blend was extruded with a single screw extruder at a die temperature of 200° C. to mold a tubing film having a thickness of 400 μm. The tubing film was flattened and exposed to 5.0 Mrad of electron beams using an electron beam generator to cause crosslinking. The gel fraction was measured with these samples and also with samples added with no additive. The results are shown in Table 1.

Furthermore, using hydrogenated petroleum hydrocarbon resin (ARKON P-90) in amounts of 0 to 5 parts by weight, films were prepared as described above and irradiation was performed in absorbed dosages of 4.0, 5.0 and 5.6 Mrad, respectively. The relationship between the addition amount and the gel fraction is shown in Table 2.

Furthermore, a 3 layer film was obtained through a multi-layer circular die using two extruders for the surface layer and for the core layer. In this case, the crosslinking treatment was carried out using resin in each layer, crosslinking-controlling agent added and its amount under the conditions of absorbed dosages of electron beams, as shown in Table 3. The results on the gel fractions in the respective layers calculated from the gel fractions in the whole layers and the gel fraction in the second layer alone, from which the first and third layers were removed, are also shown in Table 3.

EXAMPLE 8

This example shows that the crosslinking-controlling agent of the present invention has more excellent extrusion properties than conventional crosslinking-controlling agent and has high productivity.

After 100 parts by weight of LLDPE-a and 0.5 to 5 parts by weight of various additives shown in Table 4 were kneaded with a kneader at 210° C. for 10 minutes, the blend was extruded through a circular die with a 90 φ single screw extruder under the conditions of a resin temperature of 240° C. and an extrusion amount of 150 kg/hr to mold a tubing film having a thickness of 100 μm. The extrusion test was carried out for 3 hours to examine 4 items of the number of fish eye, remain of the crosslinking-controlling agent, current load of an extruder motor and its fluctuation in load. The results are also shown in Table 4.

The following items are used as measures for the evaluation.

(i) Fish eye

This evaluation is concerned with the formation of fish eye causing collapse of bubbles upon stretching of the film, which reduces mechanical strength of the film and injures the appearance.

The measurement was performed visually to count the number of fish eye having a diameter of 0.5 mm or more.

o: 5 or less per 1 m$^2$
Δ: 6 to 20 per 1 m$^2$
x: 21 or more per 1 m$^2$

(ii) Remain of crosslinking-controlling agent

This evaluation shows how efficiently the added crosslinking-controlling agent functions during the steps of film production. The measurement is performed by extracting the additive with chloroform and acetone from the extruded tube and purifying the extract; the purified weight is made remain and a ratio of the remain to the addition amount is defined to be an remain rate.

o: remain rate of not less than 90%
Δ: remain rate of not less than 60 to less than 90%
x: remain rate of less than 60%

(iii) Extrusion load

This evaluation shows as to whether the fluidity of resin is improved by the addition of the crosslinking-controlling agent. The extrusion load is expressed in terms of a reduction rate by comparing a current value of an extruder motor with that of non-added one.

o: The reduction was noted by 10% or more than the current value of the non-added one.
Δ: The reduction was identical with or lower by less 2% than the current value of the non-added one.
x: The current value was higher than the current value of the non-added one.

(iv) Fluctuation in load

This is to evaluate the stability of extrusion. A fluctuation width (difference between the maximum value and the minimum value) of the current value of a motor described above is divided by its average value, which is expressed by R%.

o: less than 4%
Δ: 4 to 6%
x: more than 6%

(v) Total evaluation

The results of the evaluations described above indicate influence of each crosslinking-controlling agent on the productivity placing extrusion property as the primary object. In the above items (i) through (iv), oΔ, and x are counted as 2 points, 1 point and 0 point, respectively. The total evaluation is made by the sum of these points and the number of x.

o: 6 points or more and no x
Δ: 4-5 points and no x
x: 3 points or less

EXPERIMENT 1

EVA-a was molded into a tubing film having a thickness of 600 μm with a single screw extruder at a die temperature of 200° C. This tubing film was flattened and exposed to electron beams of 0, 1.8, 2.2 and 2.7 Mrads, respectively, under the conditions of 500 KV using an electron beam generator (manufactured by Nisshin High Voltage Co., Ltd.) to cause crosslinking. The gel fractions were 0, 10, 20 and 30 wt %, respectively. Next, the tube was stretched by 7 times in the machine direction and by 5.7 times in the transverse direction at 90° C. of the film temperature when it was not crosslinked and at 130° C. when it was crosslinked. Thus, a film of 15 μm was obtained, respectively.

The relationship between the gel fraction of each film and heat sealing strength or orientation release stress is shown in FIG. 1.

As is noted from FIG. 1, the heat sealing strength is excellent as the gel fraction becomes low and conversely as the orientation release stress becomes high.

EXPERIMENT 2

HDPE-a, LDPE-a and EVA-a were molded into tubing films having a thickness of 400 μm, respectively, with a single screw extruder at a die temperature of 200° to 240° C. The tubing films were flattened and exposed to electron beams of 3 to 20 Mrad, respectively, under the condition of 500 KV using an electron beam generator (manufactured by Nisshin High Voltage Co., Ltd.) to cause crosslinking.

The relationship between the absorbed dosage and the gel fraction is shown in FIG. 2.

As is noted from FIG. 2, the iraddiation efficiency tends to become high as the melting point (crystallinity) of the resin becomes low, when the same absorbed dosage is given.

According to the process of the present invention, the crosslinking degree in each layer constituting the multi-layered film can be freely controlled by the construction described above. The process is excellent in extrusion stability and provides extremely high productivity.

In the film of the present invention obtained by the process of the present invention, various physical properties such as heat sealing characteristics, tearing strength, gloss transparency, cling strength, etc. are improved depending upon application. Further the crosslinking-controlling agents of the present invention are substances described in Positive List of the Japan Hygiene Olefin and Styrene Plastic Association and FDA or those similar thereto and thus stable in food hygiene. The films prepared using the crosslinking-controlling agents can be safely used for various packagings including food packaging.

The method of applying the film of the present invention can rationalize shrink packaging and save energy.

While the invention has been described in detail and with reference to specific embodiments thereof, it will be apparent to one skilled in the art that various changes and modifications can be made therein without departing from the spirit and scope thereof.

What is claimed is:

1. A multi-layered ethylenic resin film comprising a laminate of at least two ethylene resin layers, said layers being crosslinkable by irradiation with ionizing radiation, wherein at least one of the layers contains at least one crosslinking controlling agent selected from the group consisting of a hydrogenated petroleum hydrocarbon resin having a softening point of 70° to 140° C. and a specific gravity of 0.98 to 1.15 g/cm$^3$ obtained by hydrogenating a cationic polymer of naphtha-cracked oil C$_9$ fraction or a thermal polymerization product of dicyclopentadiene, a hydrogented terpene resin having a softening point of 85° to 115° C. and a specific gravity of 0.99 to 1.01 g/cm$^3$, and a terpene resin having a softening point of 30° to 120° C., in a concentration greater than the amount of said crosslinking controlling agent in a layer adjacent to said at least one layer.

2. A multi-layered ethylenic resin film according to claim 1, wherein the film has a core layer mainly composed of an ethylene-vinyl acetate copolymer.

3. A multi-layered ethylenic resin film according to claim 2, wherein the surface layers contain a higher concentration of the said crosslinking controlling agent than in the core layer.

4. A multi-layered ethylenic resin film according to claim 1, wherein the amount of said crosslinking agent in the layer adjacent to said at least one layer is zero.

* * * * *